United States Patent [19]

Iizuka

[11] Patent Number: 5,379,125

[45] Date of Patent: Jan. 3, 1995

[54] SIGNAL PROCESSING CIRCUIT FOR SOLID-STATE IMAGE SENSOR

[75] Inventor: Tetsuya Iizuka, Kanagawa, Japan

[73] Assignee: Sony Corporation, Tokyo, Japan

[21] Appl. No.: 913,970

[22] Filed: Jul. 17, 1992

[30] Foreign Application Priority Data

Jul. 17, 1991 [JP] Japan .................. 3-203798

[51] Int. Cl.[6] ........................................ H04N 5/335
[52] U.S. Cl. .................... 358/443; 348/250; 348/311
[58] Field of Search ..................... 358/440–443, 358/29, 213.26, 209, 164, 213.19, 44, 213.22, 67, 213.31, 32, 169, 213.28; 250/208.1, 214 P, 214 L; 307/353, 352, 358; 356/223

[56] References Cited

U.S. PATENT DOCUMENTS

| | | | |
|---|---|---|---|
| 4,364,650 | 12/1982 | Terashita et al. | 354/31 |
| 4,916,406 | 4/1990 | Ichimura et al. | 330/281 |
| 4,963,980 | 10/1990 | Suga et al. | 358/209 |
| 4,973,833 | 11/1990 | Takada et al. | 250/208.1 |
| 5,019,909 | 5/1991 | Sawachi | 358/164 |
| 5,157,498 | 10/1992 | Suga et al. | 358/209 |
| 5,202,586 | 4/1993 | Hori et al. | 307/352 |
| 5,229,859 | 7/1993 | Sasaki | 358/213.26 |
| 5,267,025 | 11/1993 | Satoh | 358/29 |

Primary Examiner—Paul Ip

[57] ABSTRACT

An image sensing system includes a solid-state image sensor having at least two horizontal shift registers for providing monochromatic multichannel signals, and a signal processing circuit for combining the signals into a monochromatic composite signal. The signal processing circuit includes a first combining circuit for producing a first output signal by selecting one of the multichannel signals alternately at regular intervals, a second combining circuit for adding together the multichannel signals to produce a second, and a third combining circuit for producing a composite signal by output signal combining the first and second signals through selection or addition. Thus, this system can produce the composite signal in either of two different combining modes, one of which is superior in frequency characteristic and the other of which can provide high S/N signals.

13 Claims, 3 Drawing Sheets

SIGNAL PROCESSING CIRCUIT FOR SOLID-STATE IMAGE SENSOR

BACKGROUND OF THE INVENTION

The present invention relates to a signal processing circuit for a solid-state image sensor, and more specifically to a monochromatic signal processing circuit for a solid-state image sensor having two or more horizontal transfer sections.

Some CCD imager sensors are provided with two or more horizontal shift registers to ease the pattern rule of the horizontal transfer section, and lower the operating frequency. Such an image sensor is connected with a signal processing circuit for combining two or more channel output signals derived from the respective horizontal registers.

One conventional system combines the channel output signals by selecting one of them alternately, and another conventional system combines the channel output signals by adding them. The former is superior in frequency characteristic, but inferior in S/N. Conversely, the latter is superior in S/N but inferior in frequency characteristic.

SUMMARY OF THE INVENTION

It is therefore an object of the present invention to provide an image sensing system which can satisfy the demand for improving the frequency characteristic and the demand for improving the signal-to-noise ratio according to the need.

According to the present invention, an image sensing system comprises a solid-state image sensor comprising at least two horizontal transfer sections for providing respective channel output signals, and a signal processing circuit for combining the channel output signals. The signal processing circuit according to the present invention comprises first, second and third combining circuits. The first combining circuit combines the channel output signals by selecting one of the channel output signals cyclically, while the second combining circuit combines the channel signals by adding the channel signals. The third combining circuit combines two output signals of the first and second combining circuits. Therefore, the signal processing circuit of the present invention can produce a composite signal by combining the multichannel output signals in either of two different combining modes of the first and second combining circuits.

DETAILED DESCRIPTION OF THE INVENTION

Figure 1:
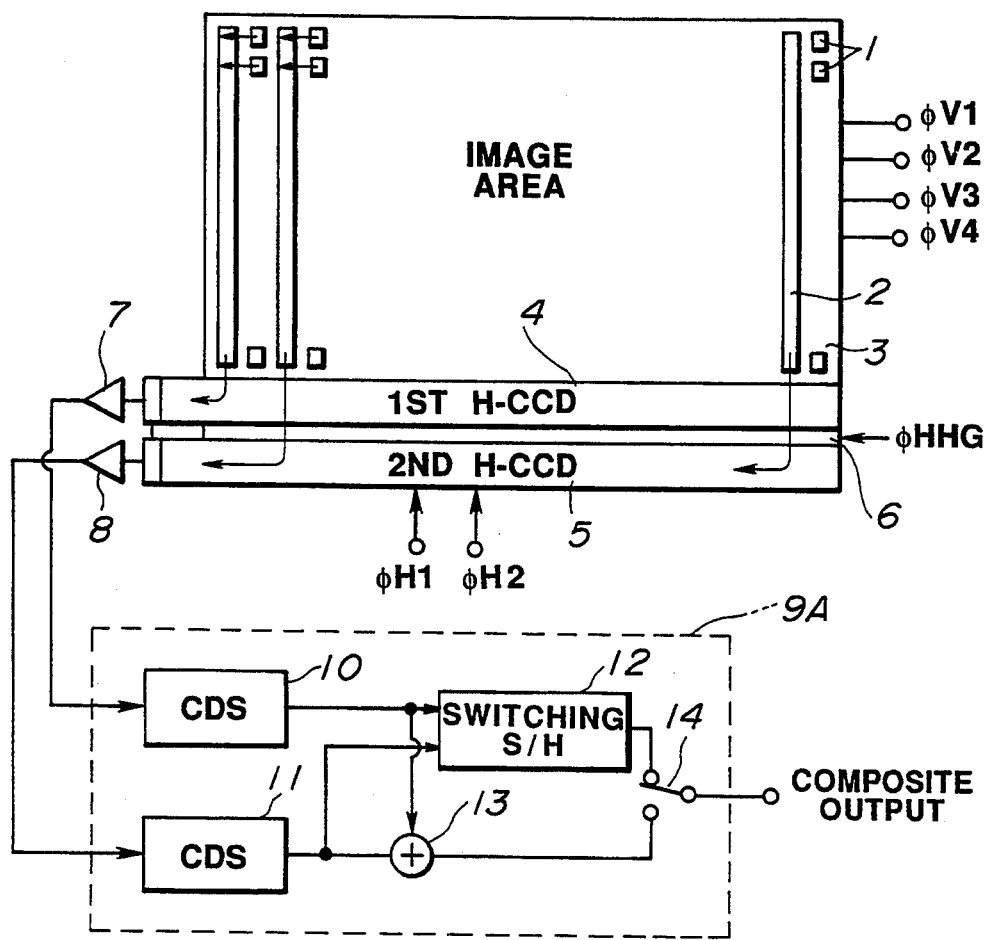
FIG. 1 is a block diagram showing an imaging system according to a first embodiment of the present invention.

FIG. 1 shows an imaging system according to a first embodiment of the present invention. This imaging system includes a solid-state image sensor, and is designed to process each information element corresponding to one picture element monochromatically. This system can be used in a monochrome camera or a three-chip color camera.

As shown in FIG. 1, this imaging system includes a CCD solid-state image sensor and a signal processing circuit 9A.

The CCD solid-state image sensor includes a plurality of photosensors 1 and vertical CCD shift registers 2. The photosensors 1 are regularly arranged in a two-dimensional (area) array, and serves as a photosensitive light receiving section. Each photosensor 1 generates and accumulates signal charge corresponding to the amount of incident light. Each vertical CCD shift register 2 receives signal charges from the photosensors 1 in an adjacent one of vertical columns of the two-dimensional photosensor array, and a transfer the signal charges in a vertical direction. The photosensors 1 and the vertical shift registers 2 constitute an image area (or imaging section) 3. The vertical CCD shift registers 2 function as a means for vertical scanning. The vertical CCDs 2 of this example have a 4-phase structure, and are driven by 4-phase vertical transfer clocks $\phi V1 \sim \phi V4$.

The image sensor further includes a plurality of horizontal shift registers for horizontal scanning, and output sections. In this example, there are two horizontal CCD shift registers 4 and 5 and two output sections 7 and 8. The horizontal CCDs 4 and 5 of this example have a two-phase structure, and are driven by two-phase horizontal transfer clocks $\phi H1$ and $\phi H2$. Between the two horizontal CCDs 4 and 5 extending in parallel to each other, there is provided a sorting transfer gate section 6 for distributing signal charge packets from the vertical CCDs 2 between the two horizontal CCDs 4 and 5. For instance, the sorting transfer gate section 6 allots the signal charge packets of the odd-numbered vertical CCDs 2 to the first horizontal CCD 4, and the signal charge packets of the even-numbered vertical CCD 2 to the second horizontal CCD 5. The first and second output sections 7 and 8 are connected, respectively, with output ends of the first and second horizontal CCDs 4 and 5. In this example, each output section comprises a floating diffusion amplifier (FDA) for receiving signal charges from one of the horizontal CCDs 4 and 5 and producing voltage signals. The first and second output sections 7 and 8 produce first and second channel output signals.

The signal processing circuit 9A of this example has first and second input terminals for receiving the first and second channel output signals from the first and second output sections 7 and 8, respectively. The signal processing circuit 9A of the example shown in FIG. 1 includes two correlated double sampling (CDS) circuits 10 and 11 for reducing noise, and first, second and third combining circuits 12, 13 and 14. The CDS circuits 10 and 11 are effectual specifically for removing low frequency components in amplifier noise of the floating diffusion amplifier, and reset noise. It is optional to employ, in place of each of the CDS circuits 10 and 11, an integral type CDS circuit, an alternate gain inversion (AGI) circuit, or a reflection-delayed noise suppression (RDS) circuit.

Each of the first and second combining circuits 12 and 13 of this example has two input terminals and one output terminal. The first channel output signal of the first output amplifier 7 is supplied, through the first CDS circuit 10, to the first input terminal of each of the first and second combining circuit 12 and 13. The second channel output signal of the second output amplifier 8, is supplied, through the second CDS circuit 11, to the second input terminal of each of the first and second combining circuit 12 and 13. In the example shown in FIG. 1, the first combining circuit 12 is a switching (or alternating) sample-and-hold circuit, and the second combining circuit 13 is an adder.

Figure 2A:
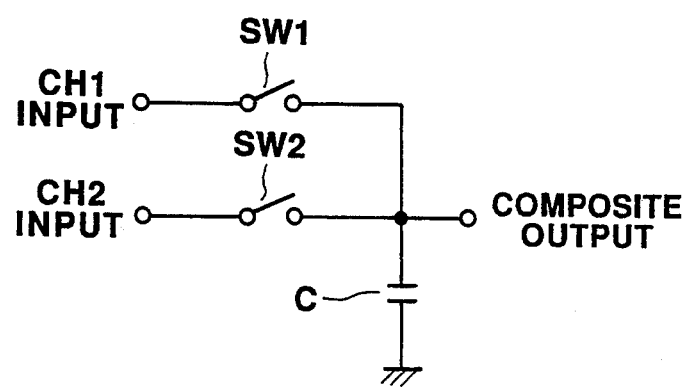
FIG. 2A is a circuit diagram showing a switching sample-and-hole circuit which can be used in the system of FIG. 1.
Figure 2B:
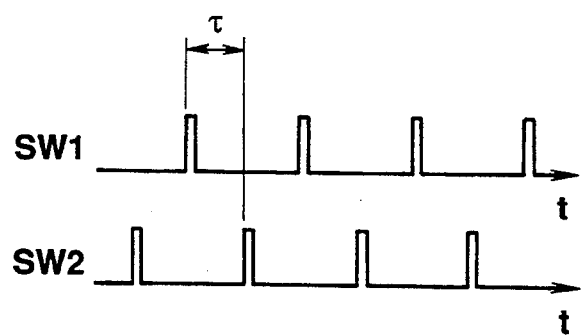
FIG. 2B is a timing chart showing signals for controlling the circuit of FIG. 2A.

As shown in FIG. 2A, the switching sample-and-hold circuit 12 includes a first switch (or switching element) SW1 connected between the first input terminal and a branch point which is connected with the output terminal of the first combining circuit 12, and a second switch (or switching element) SW2 connected between the second input terminal and the branch point of the first combining circuit 12, and a capacitor (condensor) C connected between the branch point and a ground. The first and second switches SW1 and SW2 are controlled by first and second sampling pulse signals shown in FIG. 2B. The switching sample-and-hold circuit 12 shown in FIG. 2A combines the two channel signals into a first composite output signal by alternating between sampling of the first channel signal and sampling of the second channel signal at regular time intervals $\tau$. In the example shown in 2A, the first combining circuit 12 comprises an output circuit including the output terminal of the first combining circuit 12, and the holding capacitor C serving as a holding means.

Figure 3A:
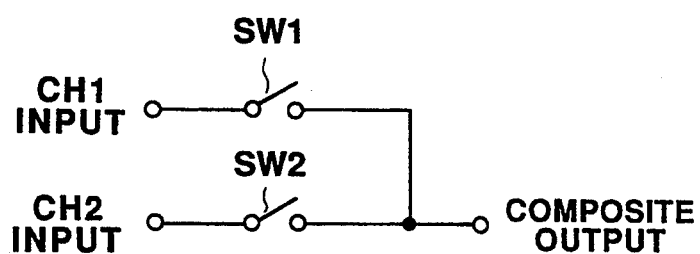
FIG. 3A is a circuit diagram showing a switching gate circuit which can be used in the system of FIG. 1, instead of the circuit of FIG. 2A.
Figure 3B:
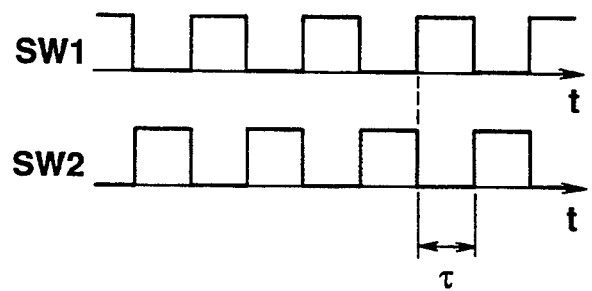
FIG. 3B is a timing chart showing signals for controlling the circuit of FIG. 3A.

It is optional to employ a switching gate circuit shown in FIG. 3A, instead of the circuit shown in FIG. 2A. The circuit show in FIG. 3A includes a first switch SW1 between the first input terminal and the output terminal of the first combining circuit 12, and a second switch SW2 between the second input and output terminals. The first and second switches SW1 and SW2 are controlled by first and second drive pulse trains which are opposite in phase to each other. Therefore, the switching gate circuit periodically alternates between a first state in which the first switch SW1 is closed and the second switch SW2 is open, and a second state in which the first switch SW1 is open and the second switch SW2 is closed.

The adder 13 is a circuit for adding two input signals and producing an output signal representing the sum of the two input signals. Therefore, the second combining circuit of this example produces a second composite output signal by adding the first and second channel signals.

The third combining circuit 13 also has a first input terminal connected with the output terminal of the first combining circuit 12, a second input terminal connected with the output terminal of the second combining circuit 13, and one output terminal for delivering a third and final composite output signal. In the example shown in FIG. 1, the third combining circuit 14 is a change-over (or selector) switch for connecting the output terminal with one of the first and second input terminals alternatively. The third combining circuit 14 delivers either of the output signals of the first and second combining circuits 12 and 13, as the third composite output signal, from the output terminal of the signal processing circuit 9A.

The combining mode of the switching sample-and-hold circuit 12 is superior in frequency characteristic, but inferior in signal-to-noise (S/N), to the simple adding mode of the adder 13. Conversely, the adder 13 is desirable in point of S/N, but poor in frequency characteristic as compared with the switching S/H circuit 12.

Therefore, this signal processing circuit 9A can satisfy the demand for higher resolutions by turning the switch 14 to the side for selecting the switching sample-and-hold circuit 12, and the demand for higher signal-to-noise ratios by selecting the output signal of the adder 13 with the switch 14.

Figure 4:
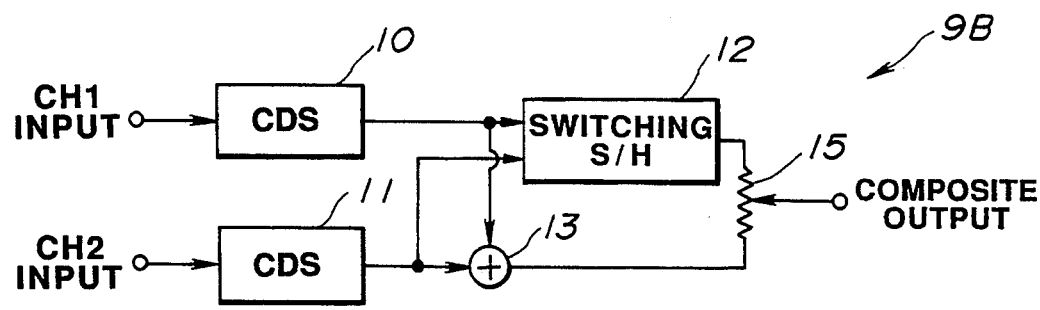
FIG. 4 is a block diagram showing a signal processing circuit according to a second embodiment of the present invention.

FIG. 4 shows a signal processing circuit 9B according to a second embodiment of the present invention. The signal processing circuit 9B is different from the signal processing circuit 9B of FIG. 1 only in the third combining circuit. In the example shown in FIG. 4, the third combining circuit comprises a variable (adjustable) resistor having a first end connected with the output terminal of the first combining circuit 12, and a second end connected with the output terminal of the second combining circuit 13. An intermediate tap between the first and second ends of the variable resistor is connected with the output terminal of the signal processing circuit 9B. In the signal processing circuit 9A of FIG. 1, the switch 14 combines the output signals of the first and second combining circuits 12 and 13 at a ratio of 1:0 or 0:1 by selecting one from the two alternatively. In the circuit 9B of FIG. 4, the third combining circuit 15 can combine the output signals of the first and second combining circuits 12 and 13 at an adjustable ratio.

The switch 14 of the third combining circuit shown in FIG. 1 may be a manual switch operated by human action, or may be a switch controlled by an automatic control section in accordance with the picture brightness and/or frequency characteristic to control the whole or part of each of pictures.

In the present invention, the solid-state image sensor may be a CTD (charge transfer device) image sensor such as a CCD image sensor as in the illustrated embodiments, or may be any other solid-state image sensor which is capable of generating dot-sequential multichannel outputs. To improve the resolution, some imagers employ a technique of arranging pixels out of alignment in a manner of interpolation, or a technique of swing imaging (swing CCD) by utilizing vibrations. The present invention is also applicable to imagers of these types which can provide signals equivalent to multichannel output signals.

What is claimed is:

1. An imaging system comprising:
   a solid-state image sensor comprising a plurality of horizontal transfer sections providing a like plurality of channel signals; and
   a signal processing circuit comprising a first combining circuit coupled to receive said channel signals for producing a first composite signal by cyclically selecting one of said channel signals, a second combining circuit also coupled to receive said channel signals and configured for producing a second composite output signal by adding together said channel signals and a third combining circuit coupled to receive said first and second composite output signals and configured for combining said first and second composite output signals to produce a third composite output signal.

2. An imaging system comprising:
a solid-state image sensor comprising a plurality of horizontal transfer sections for providing a like plurality of channel signals; and
a signal processing circuit comprising a first combining circuit coupled to receive said channel signals for producing a first composite output signal by cyclically selecting one of said channel signals, a second combining circuit also coupled to receive said channel signals and configured for producing a second composite output signal by adding together said channel signals, and a third combining circuit coupled to receive said first and second composite output signals and configured for combining said first and second output signals to produce a third composite output signal,
wherein each of said horizontal transfer sections comprises a charge transfer device for transferring photogenerated signal charge packets in a horizontal direction, and an output section for producing one of said channel output signals in response to said signal charge packets, each of said first and second combining circuits comprises a plurality of input terminals each for receiving a unique one of said channel output signals, and an output terminal for delivering one of said first and second composite signals, said third combining circuit comprising a first input terminal connected with said output terminal of said first combining circuit, a second input terminal connected with said output terminal of said second combining circuit, and an output terminal for delivering said third composite output signal,
said channel output signals and said first, second and third composite output signals are all monochromatic signals.

3. An imaging system according to claim 2 wherein said first combining circuit comprises a switching means for periodically connecting each of said input terminals of said first combining circuit with said output terminal of said first combining circuit in a predetermined sequence of said input terminals of said first combining circuit, and said second combining circuit comprises an adder.

4. An imaging system according to claim 3 wherein said third combining means includes a means for combining said first and second combined output signals at a predetermined ratio.

5. An imaging system according to claim 3 wherein said third combining circuit includes a means for generating said third composite output signal representing a sum of a first product resulting from multiplication of said first composite output signal by a predetermined first coefficient and a second product resulting from multiplication of said second composite output signal by a predetermined second coefficient.

6. An imaging system according to claim 5 wherein said switching means of said first combining circuit comprises a plurality of switches each of which is connected between a unique one of said input terminals of said first combining circuit and said output terminal of said first combining circuit, said switches being closed one after another in said predetermined sequence.

7. An imaging system according to claim 6 wherein said first combining circuit further comprises a holding means which constitutes a sample-and-hold circuit with each of said switches.

8. An imaging system according to claim 6 wherein said switching means includes a means for holding said output terminal of said first combining circuit always connected to one of said input terminals of said first combining circuit.

9. An imaging system according to claim 3 wherein said third combining circuit comprises a selector switch.

10. An imaging system according to claim 3 wherein said third combining circuit comprises a resistive element comprising a first end connected to said first input terminal of said third combining circuit, a second end connected to said second input terminal of said third combining circuit, and an intermediate tap connected to said output terminal of said third combining circuit.

11. An image sensing system comprising:
a solid-state image sensor comprising a first horizontal transfer section for providing a first channel signal, and a second horizontal transfer section for providing a second channel signal; and
a signal processing circuit coupled to receive said first and second channel signals and comprising:
a first combining circuit having a first input terminal receiving said first channel signal, a second input terminal receiving said second channel signal and an output circuit having an output terminal and switching means for connecting said output circuit to said first and second input terminals in a periodic and alternate manner to produce a first composite output signal,
a second combining circuit having input terminals coupled to receive said first and second channel signals and adding together said first and second channel signals to produce a second composite output signal at an output terminal of said second combining circuit, and
a third combining circuit having input terminals coupled to said output terminals of said first and second combining circuits and combining said composite output signals of said first and second combining circuits to produce a third composite output signal at an output terminal of said combining circuit.

12. An image sensing system comprising:
a solid-state image sensor comprising a first horizontal transfer section for providing a first horizontal transfer section for providing a first channel signal, and a second horizontal transfer section for providing a second channel signal; and
a signal processing circuit coupled to said first and second channel signals and comprising:
a first combining circuit having a first input terminal receiving said first channel signal, a second input terminal receiving said second channel signal and an output circuit having an output terminal and switching means for connecting said output terminal to said first and second input terminals in a periodic and alternate manner to produce a first composite signal at said output terminal,
a second combining circuit having input terminals coupled to said first and second channel signals and configured to add together said first and second channel signals to produce a second composite output signal at an output terminal of said second combining circuit, and
a third combining circuit having input terminals coupled to said output terminals of said first and second combining circuits and configured to combine said composite signals of said first and second composite signals of said first and second combining circuits to produce a third composite signal at an output terminal of said third combining circuit, wherein said switching means of said first combining circuit comprises a first switching element for closing and opening a circuit connecting said first input terminal and said output circuit, and a second switching element for closing and opening a circuit connecting said second input terminal and said output circuit, said switching means closing said first and second switching elements alternately at regular time intervals.

13. An imaging system according to claim 12 wherein each of said first and second horizontal transfer sections comprises a CCD shift register, and a floating diffusion amplifier, and said signal processing circuit further comprises a first noise reducing circuit comprising an input terminal connected with said first transfer section and an output terminal connected with said first input terminals of said first and second combining circuits, and a second noise reducing circuit comprising an input terminal connected with said second transfer section and an output terminal connected with said second input terminals of said first and second combining circuits.

* * * * *